UNITED STATES PATENT OFFICE.

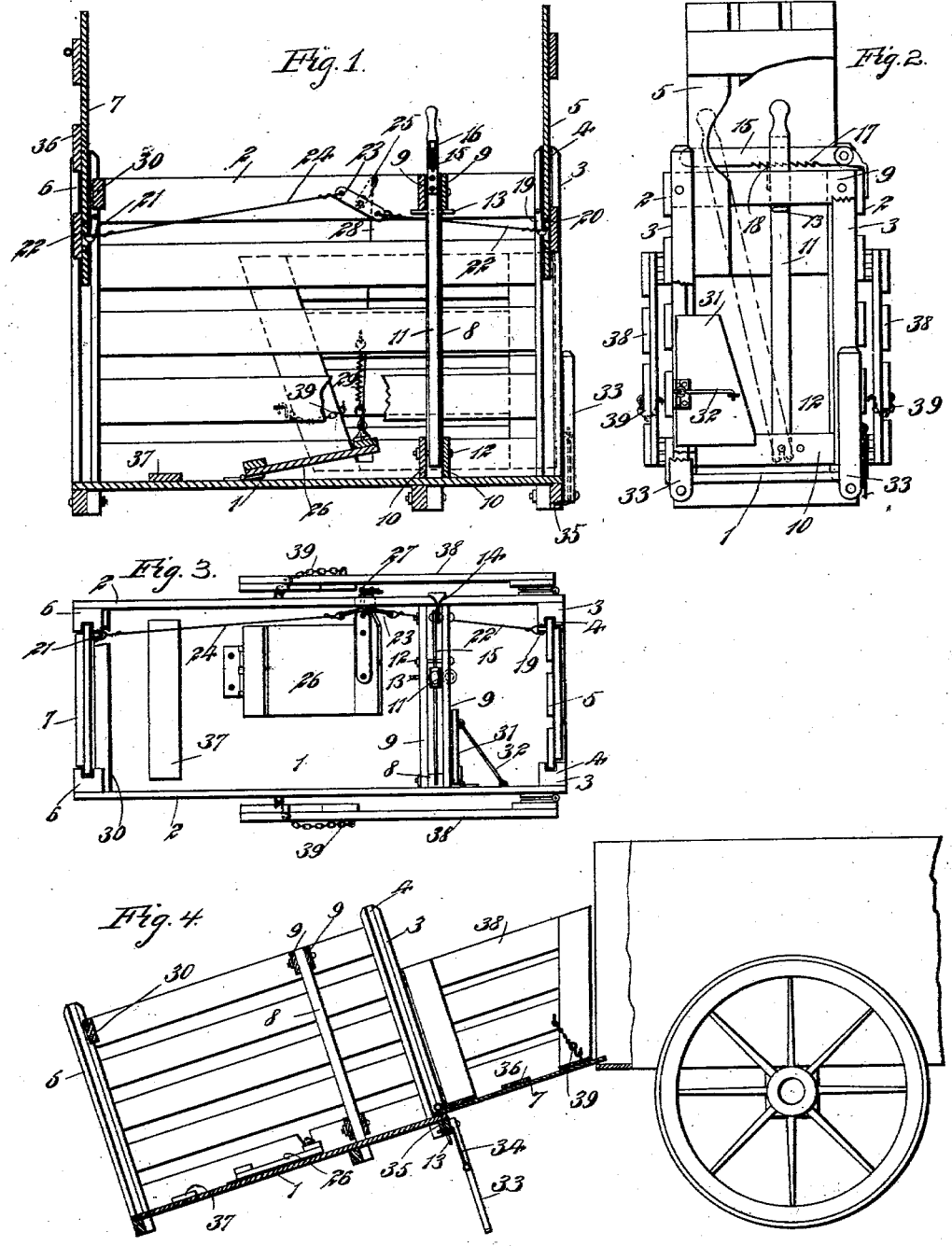

JOHANN JANSSEN EHMEN, OF CHATTAN, ILLINOIS.

HOG-TRAP.

SPECIFICATION forming part of Letters Patent No. 629,243, dated July 18, 1899.

Application filed February 28, 1899. Serial No. 707,172. (No model.)

*To all whom it may concern:*

Be it known that I, JOHANN JANSSEN EHMEN, of Chattan, in the county of Adams and State of Illinois, have invented a new and Improved Hog-Trap, of which the following is a full, clear, and exact description.

This invention relates to improvements in traps for trapping and holding hogs for ringing their noses and for other purposes; and the object is to provide a trap which when in position for entrapping will have both its end doors open, so that the hog will see what appears to be a clear passage-way and will readily enter, but upon entering the trap the hog will, by stepping upon a tripping device, release both doors, so that they will close simultaneously.

Another object of my invention is to so construct the trap that it may be used for loading hogs or other animals into a wagon or car.

I will describe a hog-trap embodying my invention and then point out the novel features in the appended claims.

Reference is to be had to the accompanying drawings, forming a part of this specification, in which similar characters of reference indicate corresponding parts in all the figures.

Figure 1 is a vertical section of a hog-trap embodying my invention. Fig. 2 is a front end view with a portion broken away to more clearly show the parts. Fig. 3 is a top plan view, and Fig. 4 is a sectional elevation showing the device as used for loading a wagon or the like.

The trap comprises a floor or platform 1, upon which are mounted the side pieces 2, which preferably consist of slatwork. The front posts 3, which extend up from the floor or platform and to which the forward ends of the side slats are secured, are channeled on their inner sides, as at 4, to form guides for the vertically-sliding front door 5, which is preferably made of vertically-disposed slats spaced apart and secured to battens. At the rear end of the trap are similar posts 6, having channels forming guides for a door 7, which is made solid and is provided with battens 36.

Secured to the side pieces 2 a short distance inward of the front door are uprights 8, and extended across the trap and secured to the opposite sides of the uprights at the tops are guide-strips 9, and similar strips 10 are extended across the bottom of the trap.

A holding-lever 11 is adapted to swing upon either one of a series of bolts 12, extended across the lower strips 10, and this lever extends upward between the upper strips 9. The lower end of the lever 11 has an outwardly-opening notch, so that it may be readily removed from a bolt 12, and I provide a number of bolts, so that the lever may be adjusted to hold small or large pigs or hogs. The lever is held against accidental upward movement or detachment by means of a pin 13, extended through a hole in said lever underneath the strips 9.

Mounted to swing on a lug 14, secured to one of the side pieces 2, is a locking-lever 15 for the lever 11. This locking-lever passes through a slot 16, formed in the lever 11, and the locking-lever is provided with teeth 17, adapted to engage with a plate 18 on the lever 11 to hold said lever in its holding position.

I will now describe means for holding the doors 5 and 7 in their open position and also means for releasing them. This means consists of a hook 19, pivoted to one of the posts 3 and adapted for engagement with a plate or keeper 20 on the front door 5, and a similar hook 21 is pivoted to one of the rear posts 6 and is adapted to engage with a keeper 22 on the rear door 7. From the hook 19 a wire 22 or the like extends to a connection with one end of a lever 23, and from the other end of this lever 23 a wire or similar connection 24 extends to the hook 21. This lever 23 has its central shaft extended through the side pieces 2, and to the outer end of this shaft and extended at right angles to the lever is an arm 25.

Mounted to swing on the floor or platform 1 is a tripping-platform 26, and from an outwardly-extending arm 27 of said platform a wire or the like 28 extends to a connection with the arm 25. The platform 26 is held normally in its inclined position by means of a spring 29, which at one end is connected to the arm 27 and at the other end to a side piece of the trap.

The frame, comprising the uprights 8 and the strips 9 and 10, serves not only as a frame for the holding-lever 11, but also serves to stiffen the side pieces, and they are further stiffened or held from spreading apart by a cross-strip 30, secured to the rear posts 6 near the top. It will be noted that there is no crosspiece between the front posts 3. Said crosspiece is omitted, so that a person may readily enter the trap after removing the front door for operating upon the hog.

Arranged forward of the frame for the lever 11 is a half-door 31. This half-door is mounted to swing on one of the side pieces of the trap, and it may be held in its closed position by means of a hook 32, attached to the side piece and adapted to engage with a staple on the door. When this door 31 is closed and the lever 11 is in its open position, as is indicated in dotted lines in Fig. 2, a hog will be compelled to pass to the rear side of the lever 11 by passing between said lever and the opposite side of the trap to that to which the door 31 is hinged, and thus insuring of the hog stepping upon the trip-platform, and the hog will also be compelled to pass his head through at the right-hand side of the holding-lever, as will be hereinafter described.

The operation is as follows: Both doors 5 and 7 are to be moved to their open position and held by the fastening devices. Then a hog is to be driven in through the rear doorway, and as the front door is open he will make an effort to pass through the front doorway; but immediately he treads upon the trip-platform 26 the catches or hooks will be disengaged from the doors, and they will quickly fall by gravity, thus entrapping the hog. When the hog finds himself thus entrapped, he will make an effort to escape through the front door, as there are openings in it, as before described. In doing so he must pass between the holding-lever 11 and the upright 8, and as soon as he passes his head through the lever 11 is to be swung against his neck and locked by the lever 15. After this the front door 5 may be removed, so that a man may enter and place the ring in the hog's nose.

To convert the device into a chute for loading or unloading hogs or other animals, I provide the trap with legs 33. These legs 33 are mounted to swing upon the lower ends of the front posts 3, so that when swung downward the trap will be supported on an inclined position. When the legs 33 are swung downward, they may be held in position by hooks 34, which are here shown as pivoted to the legs and adapted for engagement in holes in a cross-strip 35 on the platform or floor 1. To continue the platform or chute to a wagon or the like, I employ the rear door 7, which, as before stated, is a solid door. One end of this door 7 is placed upon the front end of the platform 1 and is held from movement by means of the pin 13, which has been removed from the lever 11, this pin passing through an opening or hole in the door 7 and through a hole in the platform and the cross-strip 35. The opposite end of the door 7 will of course rest upon the floor of the wagon-box. When the door 7 is used as a continuation of the platform, the battens 36 of said door are to be placed upward to provide holding-strips for the animal's feet; and it will be noted that a cleat 37 is secured to the platform or floor 1 near its rear end to prevent an animal from slipping while entering the chute or leaving the same.

Gates 38 are hinged to the sides of the trap, and when the device is not used as a chute for loading purposes these gates may be swung against the said side pieces, but when in use as a chute they are to be swung outward to form side pieces for the extension 7 and may be held in place by any suitable means—as here shown, chains 39, attached to the gates and having hooks to engage in staples on the door 7.

When the device is used for a chute, of course the front door is to be removed, as is also the lever 11, and the half-door 31 swung to its open position, and the trip-platform 26 is to be released from its spring, so that it may move down close upon the platform or floor 1, all as plainly indicated in Fig. 4.

It is obvious that this device may be employed as a cage for shipping small animals, such as calves, sheep, and pigs.

Having thus fully described my invention, I claim as new and desire to secure by Letters Patent—

1. A hog-trap, comprising a floor, side pieces extended upward from said floor, vertically-movable end doors for the trap, hooks for engaging the said doors to hold them open, a lever having connection with each of said hooks, a crank-arm on the shaft of the lever, a platform having swinging connection with the floor of the trap, an arm extended outward from said platform, and a connection between said arm and the crank-arm, substantially as specified.

2. A hog-trap, comprising a floor, removable end doors for the trap, side pieces for the trap, a removable holding-lever in the trap, legs pivotally mounted on one end of the trap, swinging gates on the sides of the trap, and means for connecting one of the said doors to the floor of the trap to form a continuation thereof, substantially as specified.

JOHANN JANSSEN EHMEN.

Witnesses:
H. H. EMMINGA,
WILKE D. DUIS.